(12) United States Patent  (10) Patent No.: US 8,509,487 B2
Lim et al.  (45) Date of Patent: Aug. 13, 2013

(54) SYSTEM AND METHOD FOR OPTICALLY MEASURING A PARAMETER OF AN OBJECT

(75) Inventors: Teng Hun Lim, Gelugor (MY);
Kuldeep Kumar Saxena, Singapore (SG); Meng Whui Tan, Sungai Ara (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1549 days.

(21) Appl. No.: 11/737,234

(22) Filed: Apr. 19, 2007

(65) Prior Publication Data
US 2008/0260262 A1  Oct. 23, 2008

(51) Int. Cl.
*G06K 9/00* (2006.01)

(52) U.S. Cl.
USPC .................. 382/106; 382/107; 382/218

(58) Field of Classification Search
USPC ...................... 382/106, 10, 154, 218
See application file for complete search history.

(56) References Cited

U.S. PATENT DOCUMENTS

| 3,443,099 | A | * | 5/1969 | Ashcraft | 250/203.6 |
| 4,586,148 | A | * | 4/1986 | Rehder et al. | 382/141 |
| 4,639,592 | A | * | 1/1987 | Heitmann | 250/223 B |
| 4,731,853 | A | * | 3/1988 | Hata et al. | 382/153 |
| 5,121,445 | A | * | 6/1992 | Tsujiuchi et al. | 382/280 |
| 5,291,131 | A | | 3/1994 | Suzuki et al. | |
| 5,578,813 | A | | 11/1996 | Allen et al. | |
| 6,118,132 | A | * | 9/2000 | Tullis | 250/559.39 |
| 6,594,539 | B1 | * | 7/2003 | Geng | 700/117 |
| 6,891,570 | B2 | * | 5/2005 | Tantalo et al. | 348/362 |
| 7,057,197 | B2 | | 6/2006 | Stusak | |
| 7,423,737 | B2 | * | 9/2008 | Saxena et al. | 356/28 |
| 2001/0028729 | A1 | * | 10/2001 | Nishigaki et al. | 382/104 |
| 2007/0229827 | A1 | * | 10/2007 | Gast et al. | 356/390 |

FOREIGN PATENT DOCUMENTS
TW  580563  3/2004

* cited by examiner

*Primary Examiner* — John Strege

(57) ABSTRACT

A system and method for optically measuring a parameter of an object uses a first segment of the object captured as a first frame of image data using a first imaging region of an image sensor array and a second segment of the object as a second frame of image data using a second imaging region of the image sensor array, which is larger than the first imaging region, to determine a displaced distance of the object relative to the image sensor array.

19 Claims, 6 Drawing Sheets

SYSTEM AND METHOD FOR OPTICALLY MEASURING A PARAMETER OF AN OBJECT

BACKGROUND OF THE INVENTION

Systems for measuring speed and/or length of moving objects are needed for various applications. As an example, a system for measuring the speed and length of a yarn may be needed for a yarn producing machine to measure the output of the machine. Conventional systems for measuring speed and/or length of moving objects include physical contact-type measuring systems and optical measuring systems.

Conventional physical contact-type measuring systems typically use a roller that contacts a moving object that is being measured. The rotation of the roller is then measured using a rotation sensor to calculate the speed of the moving objects. From the speed calculation, the length of the moving object can be derived for a certain time interval.

A concern with conventional physical contact-type measuring systems is that the roller introduces resistance, which can affect the performance of the machinery that is moving the object. Another concern is that these systems are subject to structural failure due to the mechanical nature of the roller. Still another concern is that the contact of the roller with the moving object may introduce contaminations, which may degrade the quality of the object Conventional optical measuring systems typically use an image sensor array with active photosensitive elements to electronically capture a surface of a moving object as successive frames of image data. When capturing the image frames, all the active photosensitive elements of the image sensor array are used to capture an individual image frame. Thus, the captured image frames are of the same size. These image frames are compared to track displacement of features in the image frames. The feature displacement can then be used to calculate the speed and/or length of the moving object.

A concern with conventional optical measuring systems is that comparing image frames to track displacement of features requires a significant amount of data processing. Thus, these conventional optical measuring systems are limited by their data processing capability and/or the speed of the moving object being measured. Thus, a potential solution requires the use of fast processors, which translates into increase in system cost. Another concern is that these systems are not very reliable when the width of the moving object being measured is thin, especially when high speeds of the moving object are involved.

Thus, there is a need for a system and method for optically measuring the speed or length of a moving object, which can produce reliable results while minimizing cost.

SUMMARY OF THE INVENTION

A system and method for optically measuring a parameter of an object uses a first segment of the object captured as a first frame of image data using a first imaging region of an image sensor array and a second segment of the object as a second frame of image data using a second imaging region of the image sensor array, which is larger than the first imaging region, to determine a displaced distance of the object relative to the image sensor array. The displaced distance can be used to calculate the parameter of the object, such as the speed of the object relative to the image sensor array. The system and method allows the displaced distance of the object relative to the image sensor array to be reliably determined in an efficient manner, which translates into reduced cost.

A method for optically measuring a parameter of an object in accordance with an embodiment of the invention comprises electronically capturing a first segment of the object as a first frame of image data using a first imaging region of an image sensor array, electronically capturing a second segment of the object as a second frame of image data using a second imaging region of the image sensor array, which is larger than the first imaging region, comparing the first frame of image data with portions of the second frame of image data to determine a potential matched portion from the portions of the second frame of image data, and determining a displaced distance of the object using the position of the potential matched portion within the second frame of image data and a reference initial position within the second frame of image data.

A system for measuring a parameter of an object in accordance with an embodiment of the invention comprises an image sensor array and an image processing module. The image sensor array is used to electronically capture a first segment of the object as a first frame of image data using a first imaging region of the image sensor array and to electronically capture a second segment of the object as a second frame of image data using a second imaging region of the image sensor array, which is larger than the first imaging region. The image processing module is operatively connected to the image sensor array. The image processing module is configured to compare the first frame of image data with portions of the second frame of image data to determine a potential matched portion from the portions of the second frame of image data. The image processing module is further configured to determine a displaced distance of the object using the position of the potential matched portion within the second frame of image data and a reference initial position within the second frame of image data.

A system for measuring a parameter of an object in accordance with another embodiment of the invention comprises an image sensor array, an image processing module and a reflective surface. The image sensor array is used to electronically capture the object as frames of image data. The image processing module is operatively connected to the image sensor array. The image processing module is configured to compare the frames of image data to determine displaced distances of the object relative to the image sensor array between the frames of image data. The reflective surface is positioned to reflect a side surface of the object toward the image sensor array such that an upper surface of the object and the side surface of the object can be at least partially captured in the frames of image data.

Other aspects and advantages of the present invention will become apparent from the following detailed description, taken in conjunction with the accompanying drawings, illustrated by way of example of the principles of the invention.

DETAILED DESCRIPTION

Figure 1:
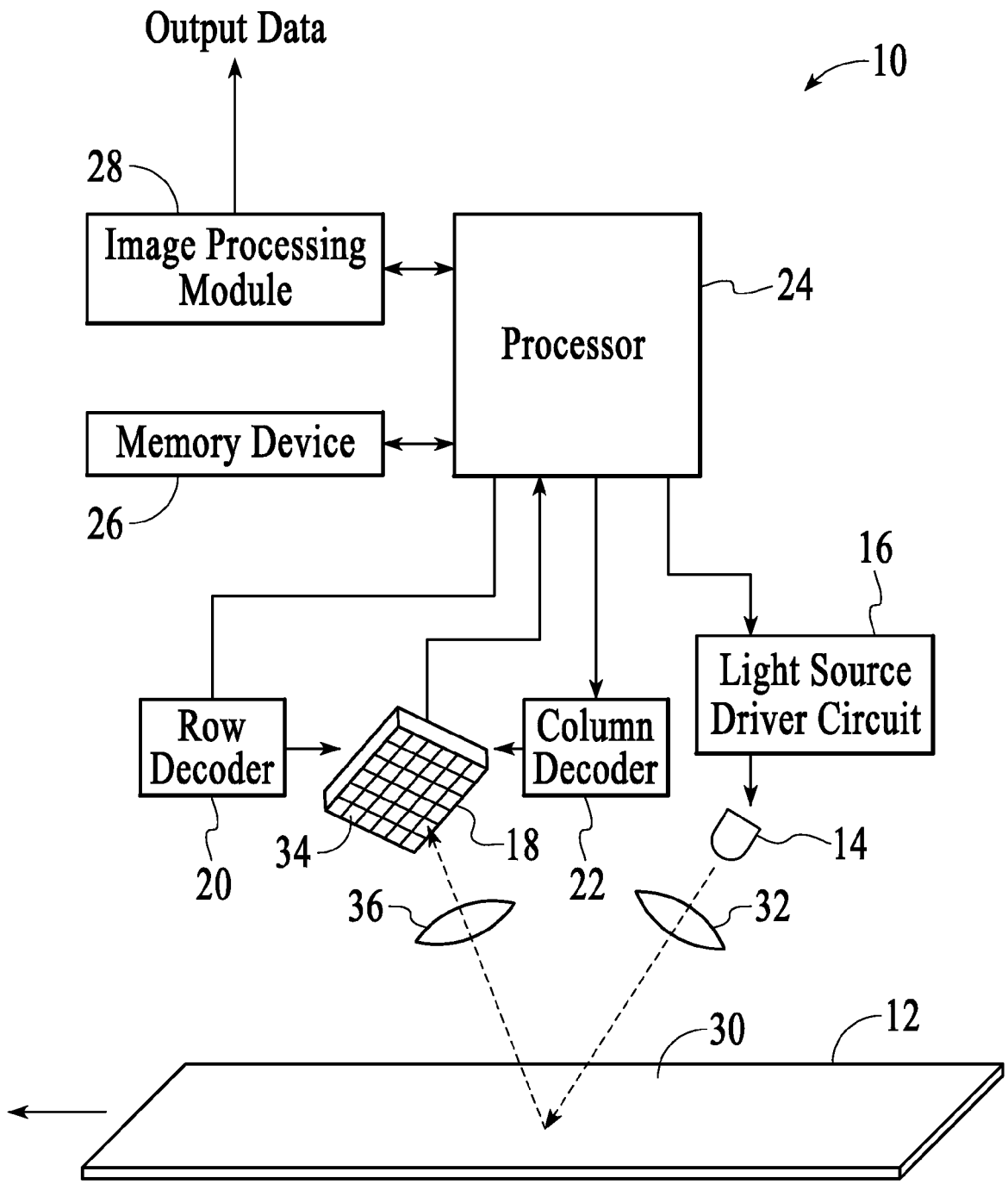
FIG. 1 is a block diagram of an optical measuring system in accordance with an embodiment of the invention.

With reference to FIG. 1, an optical measuring system 10 in accordance with an embodiment of the invention is described. The optical measuring system 10 operates to optically measure one or more parameters of a "moving" object 12 being measured, such as speed and length of the object. The object 12 being measured is "moving" relative to the optical measuring system 10. In some embodiments, the optical measuring system 10 may be stationary while the object 12 is moving in a linear direction. In other embodiments, the optical measuring system 10 may be moving in a linear direction while the object 12 is stationary. As described in more detail below, the optical measuring system 10 determines the parameters of the object 12 by electronically capturing different sized segments of the object as frames of image data and then comparing the frames of image data to calculate displaced distances of the object with respect to the optical measuring system 10 between the frames of image data. From these displaced distances, the speed of the object 12 relative to the system 10 and the length of the object per predefined duration can be reliably determined. Since the optical measuring system 10 captures different sized segments of the object 12, measuring process performed by the optical measuring system 10 is less computationally intensive than comparable measuring process performed by conventional optical measuring systems, which increases performance and/or minimizes cost of the system 10.

As shown in FIG. 1, the optical measuring system 10 includes a light source 14, a light source driver circuit 16, an image sensor array 18, a row decoder 20, a column decoder 22, a processor 24, a memory device 26 and an image processing module 28. Although these components of the optical measuring system 10 are shown in FIG. 1 as being separate components, some of these components may be integrated into fewer elements. As an example, the light source driver circuit 16, the image sensor array 18, the row and column decoders 20 and 22, the processor 24, the memory device 26 and the image processing module 28 may be integrated into a single integrated circuit (IC) chip.

The light source 14 is configured to generate light, which provides illumination on a surface 30 of the object 12. As the object 12 is displaced relative to the optical measuring system 10, different areas of the object surface 30 are illuminated by the light from the light source 14. The light source 14 may be a light-emitting diode, a laser diode or any other light-emitting device. The light source 14 is activated by the light source driver circuit 16, which provides driving signals to the light source. A lens 32 may be used with the light source 14 to focus and/or collimate the light from the light source onto the desired area of the object surface 30.

The image sensor array 18 is configured to electronically capture different sized segments of the object surface 30 as frames of image data as these segments are illuminated by the light source 14. The image sensor array 18 includes photosensitive pixel elements 34 that generate image data in the form of signals in response to light incident on the elements. In this embodiment, the image sensor array 18 is a complementary metal oxide semiconductor (CMOS) image sensor array. However, in other embodiments, the image sensor array 18 may be a different type of an image sensor array, such as a charged-coupled device (CCD) image sensor array. The number of photosensitive pixel elements 34 included in the image sensor array 18 may vary depending on at least the desired performance of the optical measuring system 10. As an example, the image sensor array 18 may be a 30×30 array of photosensitive pixel elements. However, in other embodiments, the image sensor array 18 may be a larger array. A lens 36 may be used with the image sensor array 18 to focus light reflected off the object surface 30 onto the image sensor array.

The row and column decoders 20 and 22 are electrically connected to the photosensitive pixel elements 34 of the image sensor array 18. The row decoder 20 is configured to selectively address the rows of the photosensitive pixel elements 34 of the image sensor array 18 to accumulate image signals in the form of electrical charges during integration, to readout the accumulated image signals and to reset the photosensitive pixel elements. Similarly, the column decoder 22 is configured to selectively address the columns of the photosensitive pixel elements 34 of the image sensor array 18 to accumulate, to readout and to reset the photosensitive pixel elements.

The processor 24 is electrically connected to the light source driver circuit 16 and the row and column decoders 20 and 22 in order to control the processes of capturing the object surface 30 as frames of image data. The processor 24 provides control signals to the light source driver circuit 16 to direct the light source driver circuit to apply driving signals to the light source 14 to activate the light source. The processor 24 also provides control signals to the row and column decoders 20 and 22 to direct the row and column driver circuits to selectively address the photosensitive pixels 34 of the image sensor array 18 for integration, readout and reset. Thus, the processor 24 is able to control the frame rate of the image sensor array 18. In general, the processor 24 implements various operations and functions of the optical measuring system 10.

The processor 24 may be a general-purpose digital processor such as a microprocessor or microcontroller. In other embodiments, the processor 24 may be a special-purpose processor such as a digital signal processor. In other embodiments, the processor 24 may be another type of controller or a field programmable gate array (FPGA).

The memory device 26 is configured to store data and/or instructions for use in the operation of the optical measuring system 10. In some embodiments, the memory device 26 stores instructions, which when executed by the processor 24, cause the processor to perform certain operations. However, some instructions may be stored in memory integrated into the processor 24. Additionally, the memory device 26 may store output data of the image processing module 28, which is related to one or more parameters of the object 12 being measured by the optical measuring system 10.

The image processing module 28 is configured to determine displaced distances of the object 12 relative to the image sensor array 18 using the captured frames of image data of the object surface 30. The image processing module 28 operates to correlate a first frame of image data, which represents a first captured segment of the object surface 30, with a second frame of image data, which represents a second segment of the object surface, to determine how much the object has been displaced between two frames of image data. The first segment of the object surface 30 is electronically captured using a first imaging region of the image sensor array 18. The second segment of the object surface 30 is electronically captured at a different time using a second imaging region of the image sensor array 18, which is larger than the first imaging region of the image sensor array. By comparing or correlating the first and second frames of image data, a displaced distance of the object 12 relative to the image sensor array 18 between the first and second frames of image data can be determined, as illustrated in FIGS. 2A and 2B.

Figure 2A:
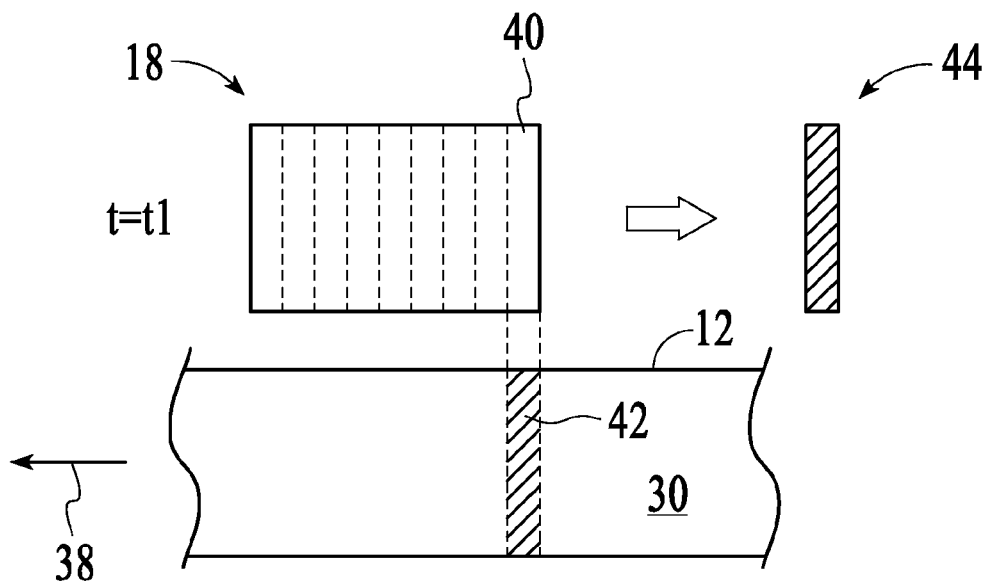
FIGS. 2A and 2B illustrate a process of electronically capturing different sized segments of an object being measured using different sized imaging regions of an image sensor array included in the optical measuring system in accordance with an embodiment of the invention.
Figure 2B:
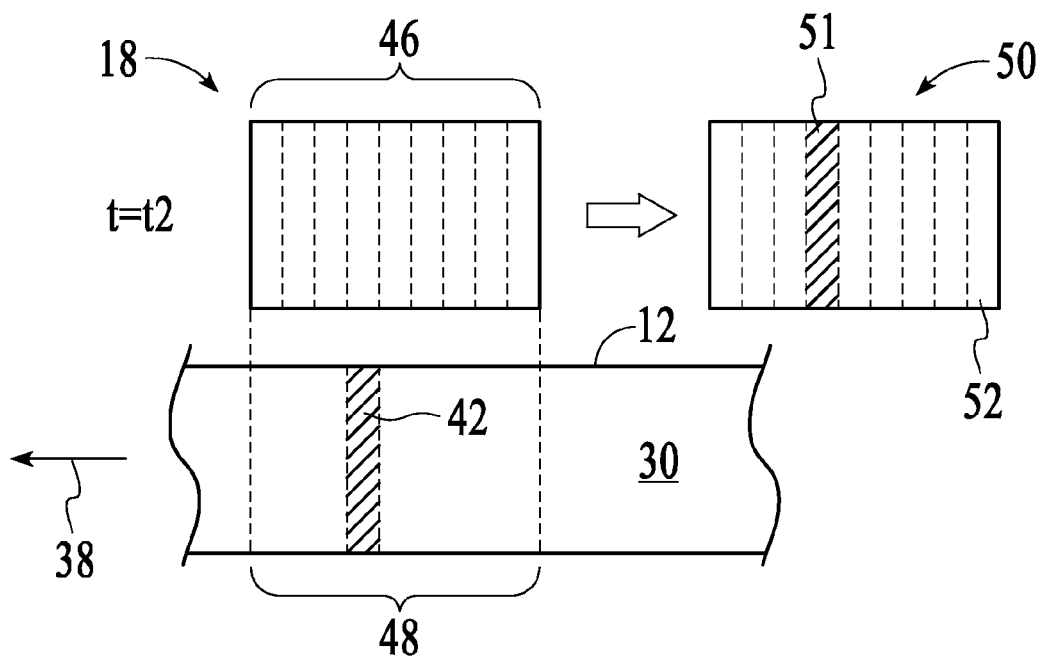

In FIGS. 2A and 2B, the object 12 being measured is shown to be moving in a linear direction relative to the image sensor array 18, and thus, the optical measuring system 10, as indicated by an arrow 38. In FIG. 2A, the object 12 is shown to be at a particular position with respect to the image sensor array 18 at t=t1. Using a first imaging region 40 of the image sensor array 18, a first segment 42 of the object surface 30 is electronically captured as a first frame 44 of image data. As illustrated in FIG. 2A, in some embodiments, the first imaging region 40 of the image sensor array 18 is an elongate imaging region, which is orientated such that the longer axis of the elongate region is approximately orthogonal to the linear displacement direction of the object 12. In an embodiment, the elongate imaging region 40 of the image sensor array 18 is a region of the image sensor array defined by a single column or row of photosensitive pixel elements 34 of the image sensor array, depending on the orientation of the image sensor array with respect to the linear displacement direction of the object 12. In other embodiments, the elongate imaging region 40 of the image sensor array 18 may be a region of the image sensor array defined by multiple columns or rows of photosensitive pixel elements 34 of the image sensor array.

In FIG. 2B, the object 12 is shown to be at another position with respect to the image sensor array 18 at t=t2 due to the linear motion of the object relative to the image sensor array. The duration between t1 and t2 is determined by the frame rate of the image sensor array 18. Thus, as shown in FIG. 2B, the first segment 42 of the object surface 30 has now been displaced to the left along the linear displacement direction of the object 12. Using a second imaging region 46 of the image sensor array 18, which is larger than the first imaging region 40 of the image sensor array, a second segment 48 of the object surface 30 is electronically captured as a second frame 50 of image data. As illustrated in FIG. 2B, in some embodiments, the second imaging region 46 of the image sensor array 18 is the entire imaging region of the image sensor array. However, in other embodiments, the second imaging region 46 of the image sensor array 18 may be a smaller portion of the entire imaging region of the image sensor array.

As illustrated in FIG. 2B, the first segment 42 of the object surface 30 has been captured in the second image frame 50. Thus, by comparing or correlating the first image frame 44 with portions of the second image frame 50, a potential matched portion 51 from the portions of the second image frame can be determined. The portions of the second image frame 50 are similar in size to the first image frame 44. The potential matched portion 51 of the second image frame 50 is the image portion that most closely matches the first image frame 44. If the object 12 has not moved relative to the image sensor array 18 between t=t1 and t=t2, the first surface segment 42 would be captured in the potential matched portion of the second image frame 50 at a reference initial position 52, which is the far right position within the second image frame in the illustrated example. The reference initial position 52 may be preprogrammed into the image processing module 28 or stored as data in, for example, the memory device 26, to be accessed when needed. However, if the object 12 has moved relative to the image sensor array 18 between t=t1 and t=t2, as in this illustrated example, the first surface segment 42 would be captured in the potential matched portion 51 of the second image frame 50 somewhere left of the reference initial position 52 within the second image frame. The distance between the position of the potential matched portion within the second image frame 50 and the reference initial position 52 within the second image frame is the displaced distance of the object 12 relative to the image sensor array 18 between the first and second image frames 44 and 50, i.e., between t=t1 and t=t2.

Using this displaced distance and the frame rate used to capture the first and second image frames 44 and 50, the speed of the object 12 relative to the optical measuring system 10 can be calculated, which can then be used to calculate the length of the object 12 per predefined duration. In some embodiments, the image processing module 28 produces output data, which represents the calculated speed and/or the length of the object 12. In other embodiments, the image processing module 28 produces output data, which represents the displaced distance of the object 12 between the frames of image data. In these later embodiments, the output data from the image processing module 28 is transmitted to an external device (not shown), such as a computer system, to calculate the speed and/or length of the object 12 using the output data.

The image processing module 28 may be implemented in any combination of software, hardware and firmware. Thus, in some embodiments, the image processing module 28 may be implemented as a set of computer code instructions stored in the memory device 26 that, when executed by the processor 24, performs the functions of the image processing module 28. In other embodiments, the image processing module 28 is incorporated into the processor 28 as part of the processor.

Figure 3:
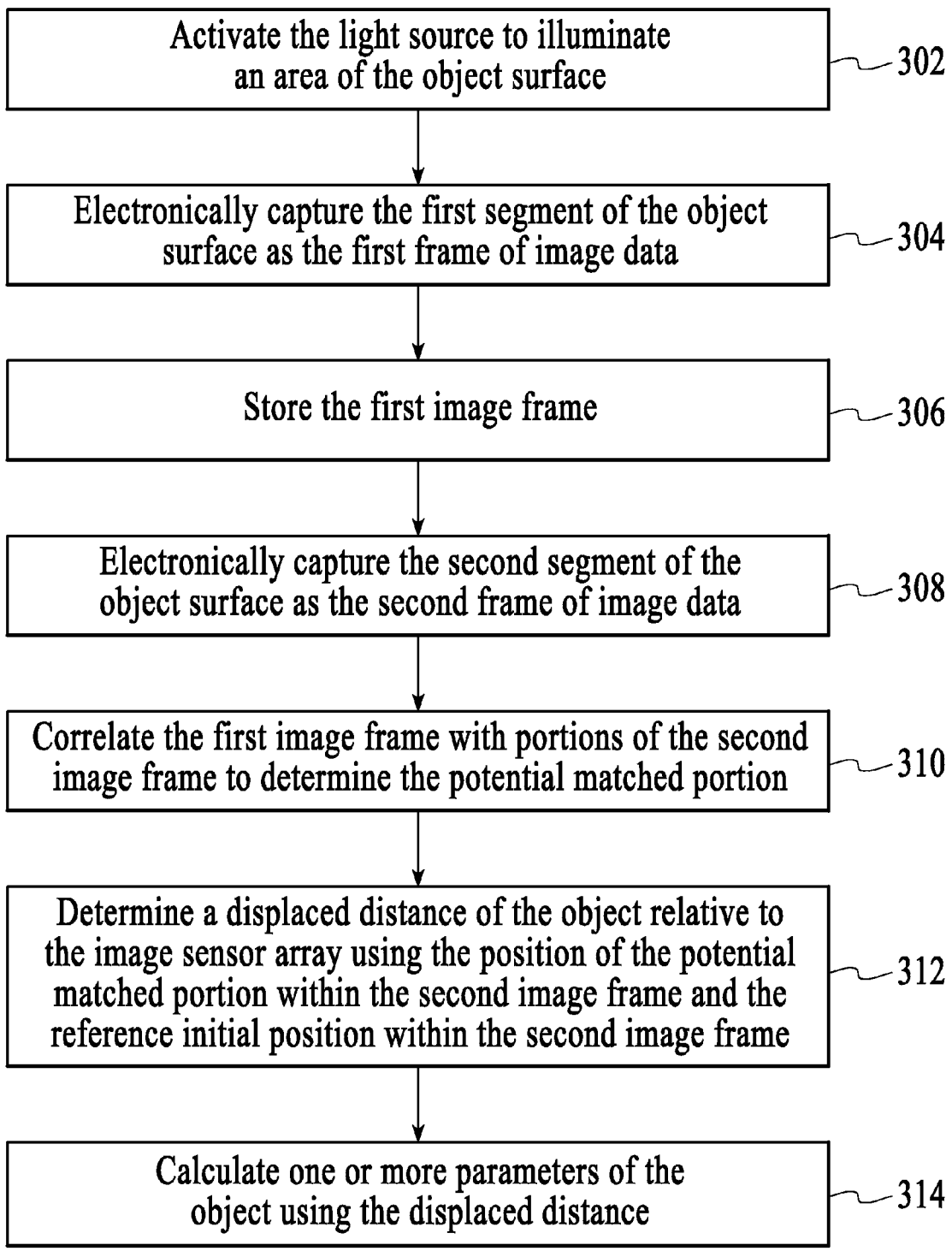
FIG. 3 is a process flow diagram of an overall operation of the optical measuring system in accordance with some embodiments of the invention.

An overall operation of the optical measuring system in accordance with an embodiment of the invention now is described with reference to a flow diagram of FIG. 3 using the illustrated example of FIGS. 2A and 2B. At block 302, the light source 14 is activated to illuminate an area of the object surface 30. The light source 14 is activated by a driving signal from the light source driver circuit 16 in response to a control signal from the processor 24.

Next, at block 304, the first segment 42 of the object surface 30 is electronically captured as the first frame 44 of image data. The first segment 42 of the object surface 30 is electronically captured using the first imaging region 40 of the image sensor array 18 addressed by the row and column decoders 20 and 22 in response to control signals from the processor 24. Next, at block 306, the first image frame 44 is stored, e.g., in the memory device 26.

Next, at block 308, the second segment 48 of the object surface 30 is electronically captured as the second frame 50 of image data. The second segment 48 of the object surface 30 is electronically captured using the second imaging region 46 of the image sensor array 18 addressed by the row and column decoders 20 and 22 in response to control signals from the processor 24.

Next, at block 310, the first image frame 44 is correlated with portions of the second image frame 50 to determine the potential matched portion 51 from the portions of the second image frame. This correlation is performed by the image processing module 28 by selectively comparing the first image frame 44 with the different portions of the second image frame 50 to find the potential matched portion 51 within the second frame of image data.

Next, at block 312, a displaced distance of the object 12 relative to the image sensor array 18 is determined using the position of the potential matched portion 51 within the second image frame 50 and the reference initial position 52 within the second image frame.

Next, at block 314, one or more parameters of the object 12 are calculated using the displaced distance. These parameters may include the speed of the object 12 relative to the optical measuring system 10, the length of the object per predefined duration or any other parameter related to the movement of the object relative to the optical measuring system. As an example, the speed of the object 12 can be calculated using the displaced distance times the pixel size of the second image frame 50 divided by the time between the capturing of the first image frame 44 and the capturing of the second image frame 50. As described above, in some embodiments, these parameters of the object 12 are calculated by the image processing module 28. However, in other embodiments, these parameters of the object 12 are calculated by an external device.

A concern with the optical measuring system 10 is that the system may not be able to reliably measure a parameter of an object if its width is thinner than the width of the image sensor array 18. One technique to address this concern is to use a wider first imaging region of the image sensor array 18 along the displacement direction to increase sensitivity. However, this technique will shorten the maximum displacement that can be detected by the optical measuring system 10, which will mean that the maximum speed of the object that can be measured by the system will be reduced. Furthermore, this technique may not be sufficient for extremely thin objects, such as yarns and other string-like objects.

Figure 4:
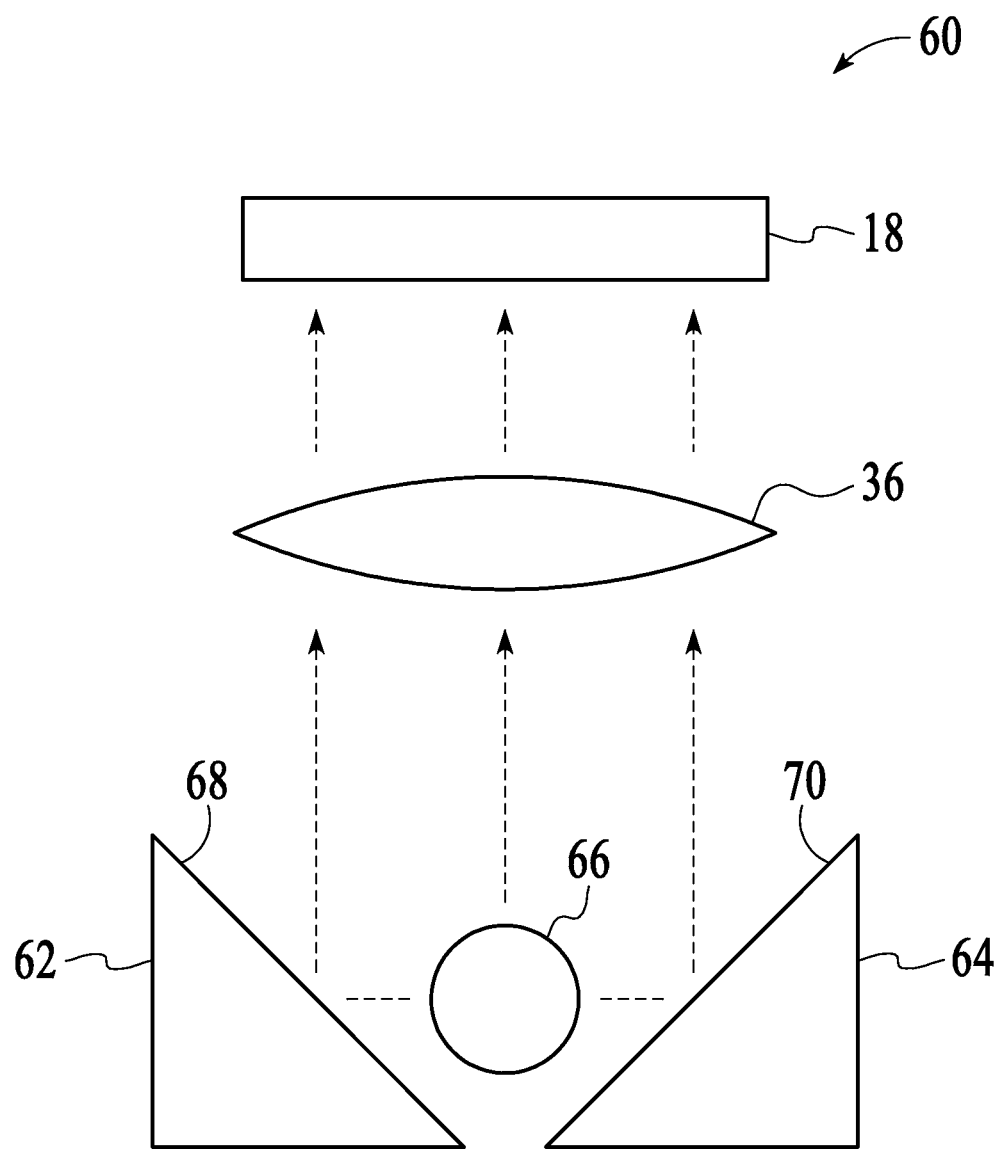
FIG. 4 is a block diagram of an optical measuring system in accordance with an alternative embodiment of the invention.

Turning now to FIG. 4, an optical measuring system 60 in accordance with an alternative embodiment of the invention is shown. The optical measuring system 60 includes all the components of the optical measuring system 10 of FIG. 1. However, in FIG. 4, only the image sensor array 18 and the lens 36 of the optical measuring system 10 are illustrated. As shown in FIG. 4, the optical measuring system 60 further includes two reflective elements 62 and 64, which are positioned adjacent to an object 66 being measured such that the object is positioned between the two reflective elements. The reflective elements 62 and 64 may be attached to a housing structure (not shown) of the optical measuring system 60, which also houses other components of the system 60. The reflective elements 62 and 64 include reflective surfaces 68 and 70, respectively, that face opposite sides of the object 66. The reflective surfaces 68 and 70 of the reflective elements 62 and 64 are angled to reflect the opposite sides of the object 66 toward the image sensor array 18 via the lens 36. In an embodiment, the angles of the reflective surfaces 68 and 70 may be approximately forty-five degrees with respect to a horizontal plane, which is parallel to a light-receiving surface of the image sensor array 18 that faces the lens 36. Using the reflective elements 62 and 64, the optical measuring system 60 captures more surface area of the object 66 being measured as frames of image data for correlation to determine the displaced distance of that object relative to the optical measuring system 60. In particular, opposite side surfaces of the object 66, as well as a top surface of the object, are electronically captured as frames of image data to be used to determine the displaced distance of the object relative to the system 60. This is illustrated in FIGS. 5A and 5B.

Figure 5A:
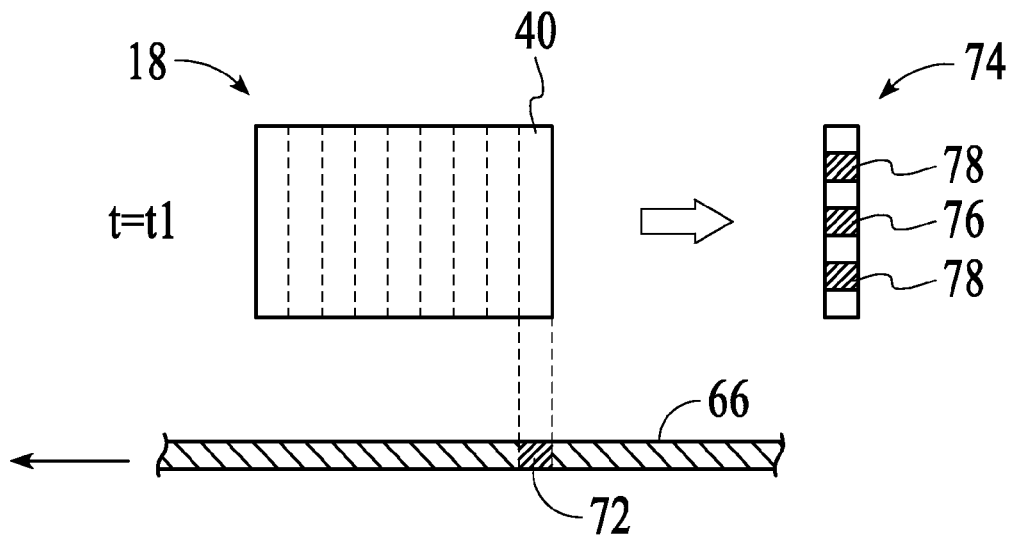
FIGS. 5A and 5B illustrate surfaces of an object being measured that are electronically captured as frames of image data using the optical measuring system of FIG. 4 in accordance with an embodiment of the invention.
Figure 5B:
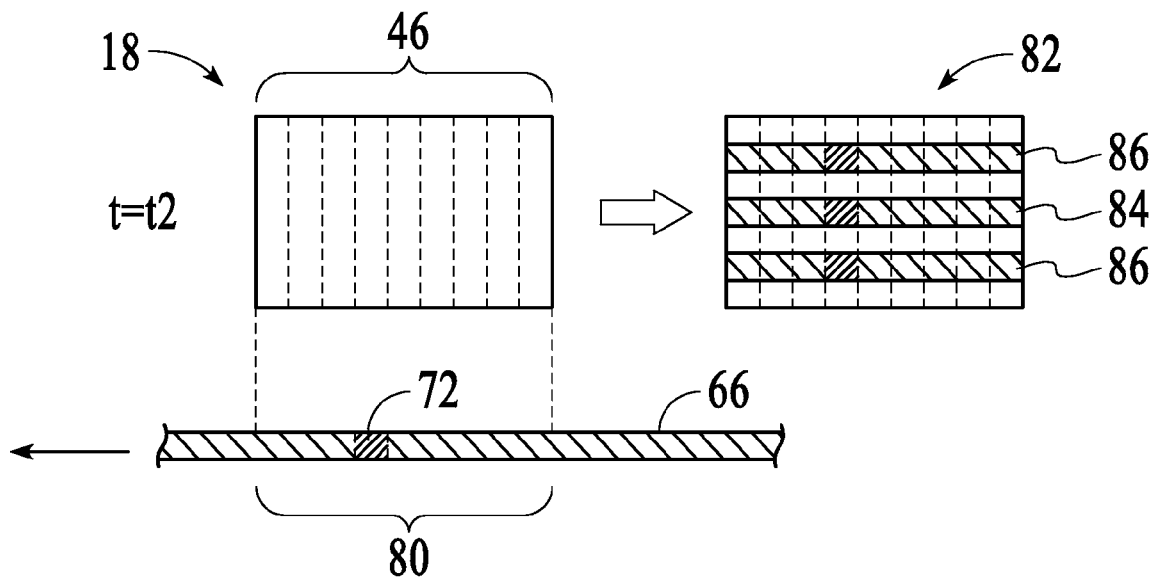

In FIG. 5A, the object 66 is shown to be at a particular position with respect to the image sensor array 18 at t=t1. Using the first imaging region 40 of the image sensor array 18, a first segment 72 of the object 66 is electronically captured as a first frame 74 of image data. Due to the reflective elements 62 and 64, an upper surface 76 and the opposite side surfaces 78 of the first segment 72 of the object 66 are captured in the first image frame 74. In FIG. 5B, the object 66 is shown to be at another position with respect to the image sensor array 18 at t=t2 due to the linear motion of the object relative to the image sensor array. Using the second imaging region 46 of the image sensor array 18, a second segment 80 of the object 66 is electronically captured as a second frame 82 of image data. Due to the reflective elements 62 and 64, an upper surface 84 and the opposite side surfaces 86 of the second segment 80 of the object 66 are captured in the second image frame 82. These first and second image frames 74 and 82 are used to determine the displaced distance of the object 66 relative to the image sensor array 18 in a manner similar to the process described above with respect to the optical measuring system 10. The displaced distance is then used to calculate one or more parameters of the object 66.

Figure 6:
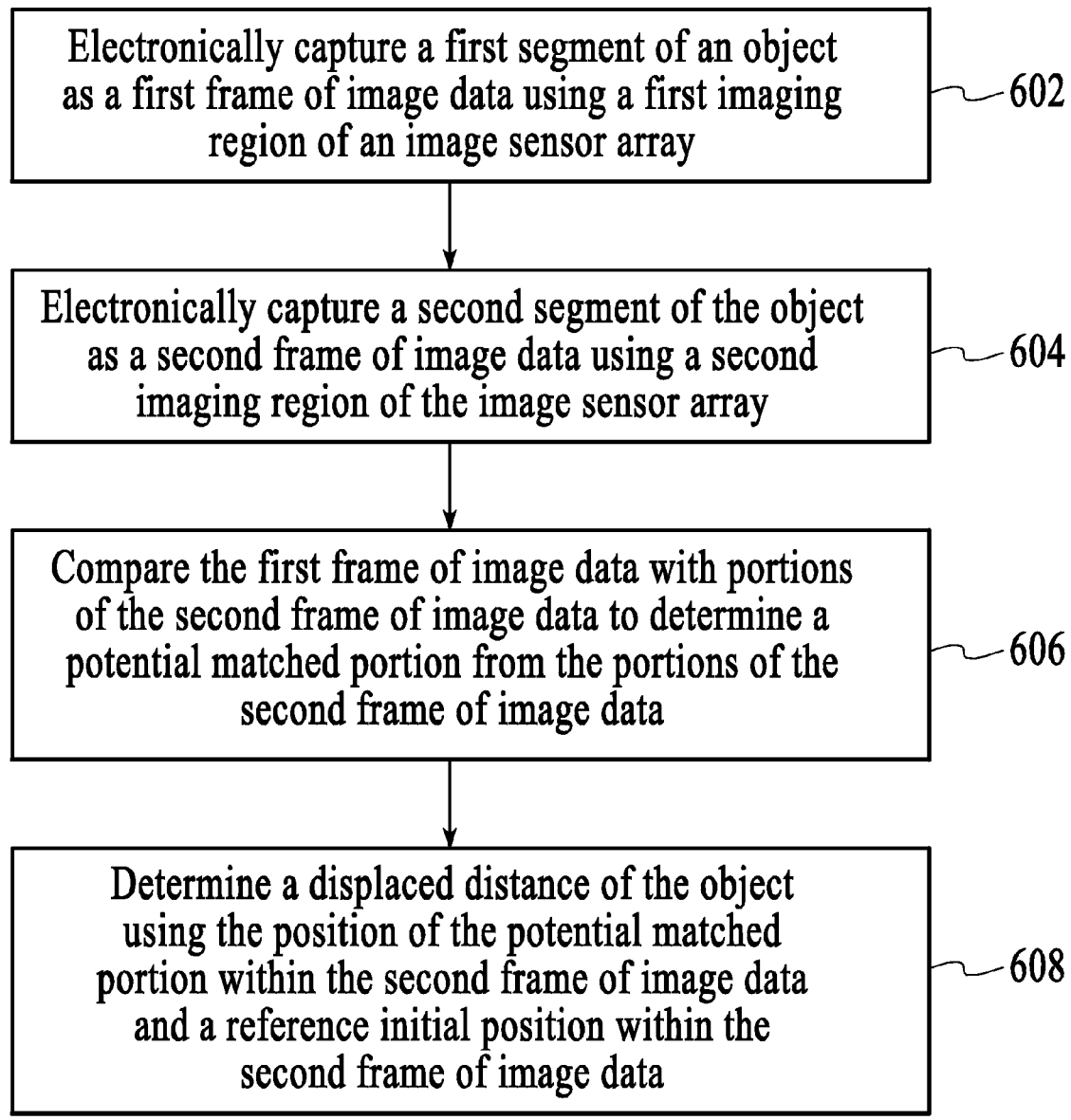
FIG. 6 is a process flow diagram of a method for optical measuring a parameter of an object in accordance with an embodiment of the invention.

A method for optically measuring a parameter of an object in accordance with an embodiment of the invention is described with reference to a process flow diagram of FIG. 6. At block 602, a first segment of the object is electronically captured using a first imaging region of an image sensor array as a first frame of image data. Next, at block 604, a second segment of the object is electronically captured using a second imaging region of the image sensor array as a second frame of image data. The second imaging region of the image sensor array is larger than the first imaging region of the image sensor array. Next, at block 606, the first frame of image data is compared with portions of the second frame of image data to determine a potential matched portion from the portions of the second frame of image data. Next, at block 608, a displaced distance of the object is determined using the position of the potential matched portion within the second frame of image data and a reference initial position within the second frame of image data.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for optically measuring a parameter of an object, said method comprising:
    electronically capturing a first segment of said object as a first frame of image data at a first time using a first imaging region of an image sensor array, said first imaging region being defined by a first set of photosensitive pixel elements of the image sensor array;
    electronically capturing a second segment of said object as a second frame of image data at a second time using a second imaging region of said image sensor array, said second imaging region being larger than said first imaging region, said second imaging region being defined by a second set of photosensitive pixel elements of the image sensor array, said second set of photosensitive pixel elements including a greater number of photosensitive pixel elements than said first set of photosensitive pixel elements;
    comparing said first frame of image data with portions of said second frame of image data to determine a potential matched portion from said portions of said second frame of image data; and
    determining a displaced distance of said object using the position of said potential matched portion within said second frame of image data and a reference initial position within said second frame of image data.

2. The method of claim 1 wherein said electronically capturing said first segment of said object as said first frame of image data includes electronically capturing said first segment of said object as said first frame of image data using a single column of photosensitive pixel elements of said image sensor array, said single column of photosensitive pixel elements defining said first imaging region of said image sensor array.

3. The method of claim 2 wherein said single column of photosensitive pixel elements of said image sensor array is the first column of photosensitive pixel elements from a side of said image sensor array.

4. The method of claim 1 wherein said electronically capturing said first segment of said object as said first frame of image data includes electronically capturing said first segment of said object as said first frame of image data using multiple columns of photosensitive pixel elements of said image sensor array, said multiple columns of photosensitive pixel defining said first imaging region of said image sensor array.

5. The method of claim 1 wherein said electronically capturing said second segment of said object includes electronically capturing said second segment of said object using all photosensitive pixel elements of said image sensor array.

6. The method of claim 1 further comprising calculating the speed of said object relative to said image sensor array using said displaced distance.

7. The method of claim 1 wherein said electronically capturing said first segment of said object includes electronically capturing an upper surface and a side surface of said first segment of said object using said first imaging region of said image sensor array and a reflective surface positioned to reflect said side surface of said object toward said image sensor array.

8. The method of claim 1 wherein said electronically capturing said first segment of said object includes electronically capturing an upper surface and opposite side surfaces of said first segment of said object using said first imaging region of said image sensor array and first and second reflective surfaces positioned to reflect said opposite side surface of said object toward said image sensor array.

9. A system for measuring a parameter of an object, said system comprising:
   an image sensor array to electronically capture a first segment of said object as a first frame of image data using a first imaging region of said image sensor array and to electronically capture a second segment of said object as a second frame of image data using a second imaging region of said image sensor array, said second imaging region being larger than said first imaging region, said first imaging region being defined by a first set of photosensitive pixel elements of the image sensor array, said second imaging region being defined by a second set of photosensitive pixel elements of the image sensor array, said second set of photosensitive pixel elements including a greater number of photosensitive pixel elements than said first set of photosensitive pixel elements; and
   an image processing module operatively connected to said image sensor array, said image processing module being configured to compare said first frame of image data with portions of said second frame of image data to determine a potential matched portion from said portions of said second frame of image data, said image processing module being further configured to determine a displaced distance of said object using the position of said potential matched portion within said second frame of image data and a reference initial position within said second frame of image data.

10. The system of claim 9 further comprising at least one decoder connected to said image sensor, said at least one decoder being configured to control said image sensor array such that said first segment of said object is electronically captured as said first frame of image data using a single column of photosensitive pixel elements of said image sensor array, said single column of photosensitive pixel elements defining said first imaging region of said image sensor array.

11. The system of claim 9 wherein said single column of photosensitive pixel elements of said image sensor array is the first column of photosensitive pixel elements from a side of said image sensor array.

12. The system of claim 9 further comprising at least one decoder connected to said image sensor, said at least one decoder being configured to control said image sensor array such that said first segment of said object is electronically captured as said first frame of image data using multiple columns of photosensitive pixel elements of said image sensor array, said multiple columns of photosensitive pixel elements defining said first imaging region of said image sensor array.

13. The system of claim 9 further comprising at least one decoder connected to said image sensor, said at least one decoder being configured to control said image sensor array such that said second segment of said object is electronically captured as said second frame of image data using all photosensitive pixel elements of said image sensor array, said all photosensitive pixel elements defining said second imaging region of said image sensor array.

14. The system of claim 9 wherein said image processing module is configured to calculate the speed of said object relative to said image sensor array using said displaced distance.

15. The system of claim 9 further comprising a reflective surface positioned to reflect a side surface of said object toward said image sensor array such that an upper surface of said object and said side surface of said object can be at least partially captured in said first and second frame of image data.

16. The system of claim 9 further comprising first and second reflective surfaces positioned to reflect opposite side surfaces of said object toward said image sensor array such that an upper surface of said object and said opposite side surfaces of said object can be at least partially captured in said first and second frame of image data.

17. A system for measuring a parameter of a three-dimensional object, said system comprising:
   an image sensor array to electronically capture said three-dimensional object as frames of image data;
   an image processing module operatively connected to said image sensor array, said image processing module being configured to compare said frames of image data to determine displaced distances of said three-dimensional object relative to said image sensor array between said frames of image data; and
   a reflective surface positioned to reflect a side surface of said three-dimensional object toward said image sensor array such that an upper surface of said three-dimensional object and said side surface of said three-dimensional object can be at least partially captured in said frames of image data,
   further comprising at least one decoder connected to said image sensor, said at least one decoder being configured to control said image sensor array such that a first segment of said three-dimensional object is electronically captured as a first frame of image data using a first imaging region of said image sensor array and a second segment of said three-dimensional object is electronically captured as a second frame of image data using a second imaging region of said image sensor array, said second imaging region being larger than said first imaging region, said first imaging region being defined by a first set of photosensitive pixel elements of the image sensor array, said second imaging region being defined by a second set of photosensitive pixel elements of the image sensor array, said second set of photosensitive pixel elements including a greater number of photosensitive pixel elements than said first set of photosensitive pixel elements.

18. The system of claim 17 wherein said image processing module is configured to compare said first frame of image data with portions of said second frame of image data to determine a potential matched portion from said portions of said second frame of image data, said image processing module being further configured to determine a displaced distance between the position of said potential matched portion within said second frame of image data and a reference initial position within said second frame of image data.

19. The system of claim 17 wherein said at least one decoder is configured to control said image sensor array such that said first segment of said three-dimensional object is electronically captured as said first frame of image data using at least one column of photosensitive pixel elements of said image sensor array, said at least one column of photosensitive pixel elements defining said first imaging region of said image sensor array.

\* \* \* \* \*